United States Patent
Jacques

[15] 3,641,873
[45] Feb. 15, 1972

[54] MILLING MACHINE WITH MULTIPLE-SPINDLE ATTACHMENT

[72] Inventor: David E. Jacques, Waterbury, Conn.
[73] Assignee: Waveline, Inc., West Caldwell, N.J.
[22] Filed: May 15, 1970
[21] Appl. No.: 37,709

[52] U.S. Cl. ................................. 90/14, 90/11 R, 408/42, 408/53
[51] Int. Cl. .................................... B23c 1/08, B23b 39/16
[58] Field of Search ................... 90/11 R, 11 A, 14; 408/42, 408/52, 53, 32

[56] References Cited

UNITED STATES PATENTS

| | | | |
|---|---|---|---|
| 1,999,197 | 4/1935 | Schauer et al. | 408/42 X |
| 3,073,023 | 1/1963 | Koeppen | 408/52 X |
| 3,442,175 | 5/1969 | Heap et al. | 408/42 X |
| 3,552,264 | 1/1971 | Meinke | 408/42 X |

Primary Examiner—Gil Weidenfeld
Attorney—Sandoe, Hopgood and Calimafde

[57] ABSTRACT

An adapter for converting a vertical single-spindle milling machine to a machine capable of simultaneously performing a number of milling operations. The adapter, which includes at least one auxiliary spindle, fits upon the quill and is supported by guide rods mounted to the frame of the machine and to the adapter. Means are provided to transmit motion from the vertical miller spindle to the adapter-auxiliary spindle, and to stabilize the auxiliary spindles so that they are unaffected by the rotation of the quill about its own axis.

13 Claims, 5 Drawing Figures

PATENTED FEB 15 1972

INVENTOR
DAVID JACQUES

BY
Sandoe, Hopgood & Calimafde
ATTORNEYS

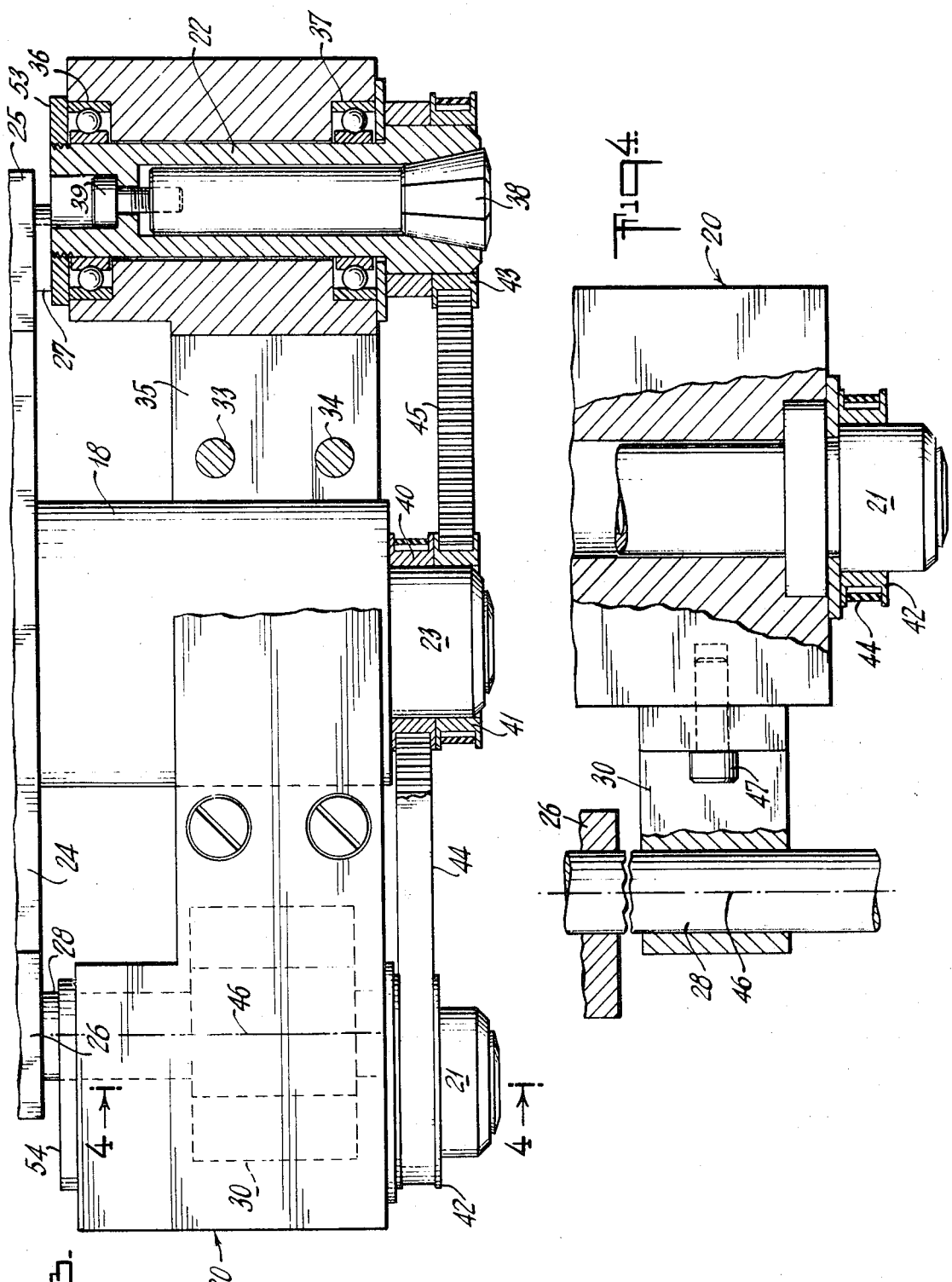

MILLING MACHINE WITH MULTIPLE-SPINDLE ATTACHMENT

This invention relates generally to milling machines, and more particularly to an attachment for use with a vertical milling machine for providing multiple-spindle operation of the machine.

General purpose vertical milling machines are characterized by a movable bearing housing or quill which provides means for vertically feeding and retracting the milling tool into and from the workpiece. To provide this motion, it is necessary to establish a small amount of clearance between the quill and its supporting structure, resulting in a slight amount of rotary play around the vertical axis of the quill. This play does not materially affect the suitability of the machine for most applications; however, as a result of the rotation of the quill, it has heretofore not been possible to provide multiple-spindle attachments for a vertical milling machine as has been done with the horizontal milling machine since the rotary play of the quill is multiplied at an outrigger or auxiliary spindle located at a distance from the axis of rotation of the quill. The resulting multiplied amount of play of the outrigger spindle is usually excessive for normal machining tolerances.

Since it is generally axiomatic that economy is served when the production output of a machine can be increased, it is an object of this invention to provide a multiple-spindle attachment for a vertical milling machine which will maintain accuracy in the auxiliary spindle or spindles, and thus afford a plurality of simultaneous milling operations.

It is a further object of the invention to provide an attachment for a vertical milling machine which enables simultaneous milling operations to be performed at a plurality of spaced locations in a reliable and accurate manner.

This invention provides an attachment for a vertical milling machine in which one or more auxiliary spindles are rotatably supported on an axis parallel to but offset from the main spindle axis, and means for driving the auxiliary spindles from the main spindle.

Stabilizing guide means are provided to connect the adapter to the frame of the machine and to establish an axis of guided support parallel to but offset from the rotary axis of the spindles. As a result, the auxiliary spindles are substantially unaffected by the rotation of the quill of the milling machine about its axis.

To the accomplishment of the above and to such further objects as may hereinafter appear, the present invention relates to a milling machine with a multiple-spindle attachment, substantially as defined in the appended claims and as described in the following specification taken together with the accompanying drawings in which:

FIG. 3 is a view in partial cross section of the attachment showing the mounting of the outrigger spindle in the attachment housing;

FIG. 4 is a view in partial cross section taken along line 4—4 of FIG. 3, showing the stabilizing means mounted upon the attachment housing and the frame of the machine; and FIG. 5 is a perspective view similar to FIG. 1 showing the attachment housing rotated 90° for performing milling operations in a plane normal to the face of the machine.

Figure 1:
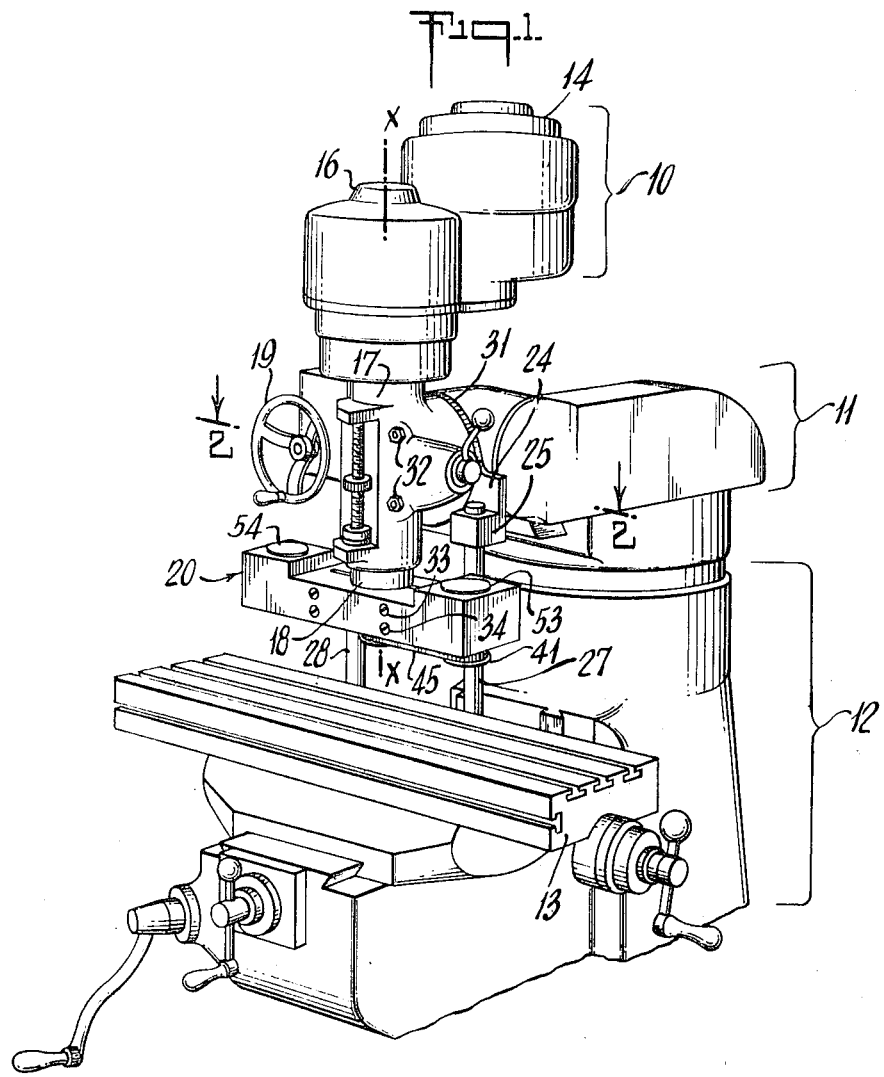
FIG. 1 is a perspective view of a vertical milling machine with the multiple-spindle attachment of this invention in place.

The milling machine shown in FIG. 1 is a typical general purpose machine. It would be inaccurate to categorize this machine as solely a vertical milling machine since the head may be positioned in all planes between the vertical and the horizontal. However, the milling machine meets the essential criterion for the environment in which the invention is useful, that is, a machine which has a movable bearing housing or quill for feeding a tool into a stationary workpiece.

The machine shown in FIG. 1 may be considered as consisting essentially of four major elements. These are the head 10, the ram 11, the base or foundation of the machine 12, and the table 13. In general, these elements will all be included in the word "frame" throughout the disclosure. The function of the base is, of course, to provide a suitable foundation for the other elements of the machine. The basic function of the table is to position the workpiece on a convenient surface under the tool. The ram is the element which permits movement of the head over the table so as to position the tool in a desired vertical plane without rechecking the squareness of the spindle. The head is the tool-carrying element.

Head 10 includes a motor 14 which provides a source of rotary power to the spindle; it may include a multispeed transmission arrangement to connect the motor and a tool-supporting spindle to enhance the versatility of the milling machine. The spindle itself is located along a vertical axis X—X and extends downwardly from a cap 16 and through a housing 17. A small portion of an elongated quill 18 is shown extending from the lower end of housing 17 and is also arranged along axis X—X. Not shown in FIG. 1 are the spindle, the collet, and tool which are mounted in and rotatably supported by the quill 18. Also not shown but located within the housing 17 are the axially elongated means which hold the quill and guide it vertically to position the tool into and out of engagement with a workpiece or the table. A manual feed mechanism for displacing the quill to advance the tool into the workpiece is shown at 19.

In accord with the present invention a multiple-spindle adapter generally designated 20 is attached to the machine to convert the machine for multiple-spindle operation, that is, to provide the machine with the capability of performing one or more additional milling operations at locations spaced from the miller or central spindle. As herein shown, the adapter carries two outrigger or auxiliary spindles 21 and 22 located within adapter 20 and are held in place by spindle nuts 53 and 54.

The auxiliary spindles are driven from the main spindle 23 carried by quill 18 by a pulley and belt arrangement shown more clearly in FIG. 3, and described in greater detail below.

The auxiliary spindles 21 and 22 are stabilized by guide means which include a bushing bracket 24 and bushings 25 and 26 secured to bracket 24. Guide rods 27 and 28 are respectively supported at their upper ends in bushings 25 and 26 and at their lower ends by brackets 29 and 30 mounted on the housing of adapter 20. In the embodiment herein illustrated, the guide rods are fixedly held in bushings 25 and 26 by means of set screws and slidably mounted in the adapter brackets 29 and 30. For increased stability, the lower ends of the guide rods may also be fixedly held in bushing brackets. Although not illustrated in the drawings, these last named brackets would be similar to bushings 25 and 26 and would preferably be mounted on the base of the machine on the axis of the guide rods.

Alternatively, the guide rods may be fixedly mounted to the adapter brackets 29 and 30 and slidably mounted in bushings 25 and 26. Such a mounting would not materially alter the function of the adapter of its stability.

The head 10 of the milling machine is joined at 31 to the ram end 11 by a simple nut and bolt arrangement, two of which are shown at 32. In the embodiment illustrated, the bushing bracket 2 is inserted between the head and the ram end at joint 31. Thus the bracket 2 is firmly affixed to the frame so as to provide an extension of the frame and a convenient surface upon which to mount the frame-attached bushings 25 and 26. As indicated above, bushing 25 provides a stationary frame-attached mount through which the guide rod 27 is inserted and fixedly held by set screws, shrink fit or any other suitable connection means. Bracket 29 is attached to the rear side of the housing of adapter 20 and is bored to a diameter closely matched but slightly larger than the diameter of the guide rod 27, thus providing a slide fit enabling the adapter 20 to move vertically with the quill by sliding along the guide rod 25. The second guide rod 28 may be seen in FIG. 1, but bushing 26 is hidden from view behind the spindle housing 17. It should be noted that the guide rods 27 and 28, together with the mounting bushings and brackets, provide a stabilizing means preventing the adapter 20 from rotating about the axis of the quill 18 despite the unavoidable play in the quill which is necessary in providing a displaceable main spindle.

In FIG. 5 the adapter 20 is shown rotated by 90° so as to align the two outrigger spindles in a plane normal to the direction of the worktable. Such a rotation is feasible only if certain conditions are met, i.e., the distance from the vertical plane defined by the axis of symmetry of the outrigger spindles to the axis of the respective stabilizing rods is equal to the distance from a vertical plane including the axis of the spindles to the respective guide rod axis; in reference to FIG. 2, dimension A, B, C, and D must all be equal. By providing this symmetry to the construction, FIG. 6 shows that guide rod 27 may be inserted into bracket 30 and stability maintained for the two outrigger spindles through the one guide rod.

Figure 2:
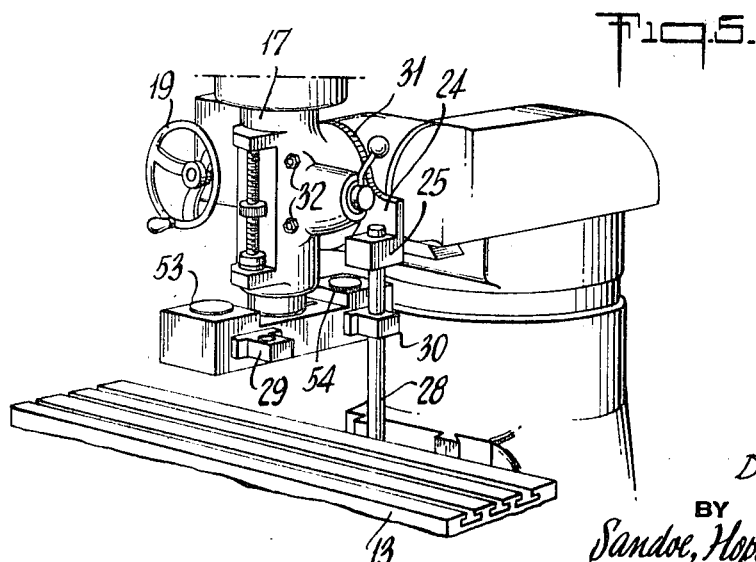
FIG. 2 is a plan view of the attachment taken along line 2—2 in FIG. 1.
Figure 2:
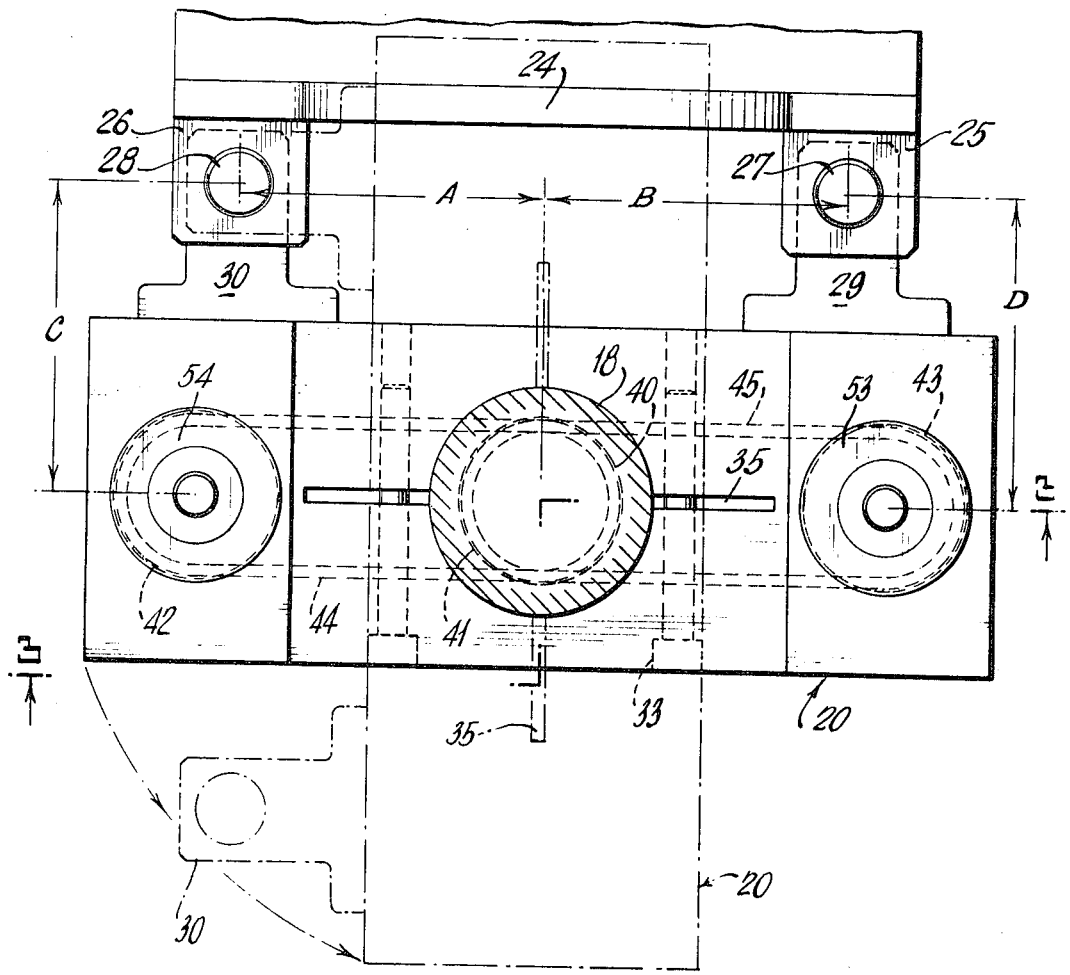

FIG. 2 shows a plan view of the adapter 20 secured to the quill by means of a collar or slide 33 clamped to the quill by means such as bolts 34. A slot 35 provides means for slipping the adapter slide onto the quill and also provides space for drawing up the adapter on the surface of the quill to provide a tight connection. The bore of quill 18 provides the area in which the spindle, collet and tool assembly is located. FIG. 2 also illustrates, in phantom, the position of adapter 20 when it is rotated 90° in the manner shown in FIG. 5.

FIG. 3 is a front view of the adapter 20 illustrating the interior driving structure surrounding the outrigger spindle 28, it being understood that the drive and mounting arrangement for the outer outrigger spindle 21 is substantially the same. High precision thrust bearings 36 and 37 are located in adapter 20 and provide means for holding spindle 22 in accurate axial alignment. A split collet 38 is shown inserted into spindle 22 and a screw 39 is provided to draw up the collet into tight engagement with the spindle. Ordinarily, a chuck assembly or tool would be inserted into the collet so that when it is drawn up by screw 39, the chuck or tool is tightened into the collet as well as tightening the collet into the spindle.

FIG. 3 clearly shows the power take off means, i.e., the pulley and belt drive mechanism whereby the outrigger spindles 21 and 22 are rotatably driven from the main or central spindle 23. Pulleys 40 and 41 are mounted on spindle 23 and connected to pulleys 42 and 43 fast on spindles 21 and 22 respectively by means of belts 44 and 45 respectively. It may be observed that the drive mechanism might have been located within the adapter between bearings 36 and 37, but for ease of maintenance has been located exterior to the adapter.

Also shown in FIG. 3, in phantom, is the position of the adapter bracket 30 on the rear of the housing adapter. It may be noted that the guide rod axis 46 is slightly offset from but parallel to the axis of the outrigger spindle 22. In FIG. 5, the adapter guide rod bracket is shown mounted by bolts such as at 47 onto the adapter 20. Any suitable connector could be used.

To install the adapter 20 on the milling machine, it is necessary only to remove the nuts 32 to remove the machine head 10. The bushing bracket 24 is then located at the joint 31 and the machine head reinstalled. The guide rods are assembled with the adapter and the assembly is then fitted into place with the guide rods positioned into the bushings, the adapter collar placed over the quill, and the clamping bolts and set screws are then tightened. To remove the multispindle attachment, the steps would be reversed.

While the principles of the invention have been described in connection with reference to the above specific embodiment, it is to be clearly understood that this description is made only by way of example and not as a limitation to the scope of the invention as set forth in the accompanying claims.

I claim:

1. In milling machine, a frame including work-supporting means and tool-supporting means, said tool-supporting means including a head secured to said frame and an elongated quill carried by said head, tool-supporting spindle means carried by said quill, said head further including axially elongated guide means and feed means for axially displacing said quill to advance and retract a quill-supported tool with respect to said work-supporting means, and a multiple-spindle adapter for converting said machine to multispindle operation; said adapter comprising a second tool-supporting spindle, a slide having a bore to fit said quill and means to clamp the same to said quill, said adapter including means for rotatably supporting said second spindle on an axis parallel to but offset from said first spindle, and power-transmission takeoff means connecting said second spindle for drive by said first spindle; and stabilizing guide means for said adapter including coacting guide elements respectively fixed to said adapter and to said frame and establishing an axis of guided support for the unitary displacement of said adapter and quill, said axis being parallel to and offset from the rotary axis of said spindles.

2. In a milling machine according to claim 1, a plurality of spaced spindles revolubly carried by said adapter on spaced axes, said power takeoff means including drive means coupled to all of said spaced spindles.

3. In a milling machine according to claim 1, said frame fixed guide element including a member intermediate said head and frame and secured thereto by means securing said head to said frame.

4. In a milling machine according to claim 1, said coacting guide elements comprising a plurality of spaced guide axes parallel to and offset from the rotary axes of said spindles.

5. In a milling machine according to claim 2, wherein there are two of said adapter spindles, with said adapter spindles being symmetrically positioned on opposite sides of said quill.

6. In a milling machine, according to claim 4, wherein said plural spaced guides are symmetrically positioned on opposite sides of the plane of symmetry of the axes of said adapter spindles.

7. In a milling machine, according to claim 5, wherein said plural spaced guides are symmetrically positioned on opposite sides of the plane of symmetry of the axes of said adapter spindles.

8. In a milling machine according to claim 2, wherein the tool-supporting ends of said spindles are in substantially the same plane normal to the axis of said quill.

9. In a milling machine according to claim 6, wherein said guides are each equidistantly spaced from said axis of symmetry and from a plane including the axis of said spindles.

10. In a milling machine according to claim 3, said spaced guides being fixedly connected to said frame-fixed element and slidably mounted to said adapter-fixed element.

11. In a milling machine according to claim 4, said spaced guides being fixedly connected to said frame-fixed element and slidably mounted to said adapter-fixed element.

12. In a milling machine according to claim 3, said spaced guides being slidably mounted to said frame-fixed element and fixedly mounted to said adapter-fixed element.

13. A milling machine according to claim 4, said spaced guides being slidably mounted to said frame-fixed element and fixedly mounted to said adapter-fixed element.

* * * * *